(12) United States Patent
Pratte

(10) Patent No.: US 7,913,829 B1
(45) Date of Patent: Mar. 29, 2011

(54) LAUNDRY CHUTE

(76) Inventor: Michelle D. Pratte, Bowling Green, MO (US)

( * ) Notice: Subject to any disclaimer, the term of this patent is extended or adjusted under 35 U.S.C. 154(b) by 0 days.

(21) Appl. No.: 12/494,461

(22) Filed: Jun. 30, 2009

(51) Int. Cl.
B65G 11/16 (2006.01)

(52) U.S. Cl. .............................. 193/33; 193/28; 193/2 R

(58) Field of Classification Search .................. 193/2 R, 193/25 R, 25 FT, 28, 2 A, 33
See application file for complete search history.

(56) References Cited

U.S. PATENT DOCUMENTS

| 2,975,877 | A | * | 3/1961 | Helgeson | 193/41 |
| 3,009,183 | A | * | 11/1961 | Lay | 193/38 |
| 3,684,072 | A | | 8/1972 | Castrellon | |
| 3,796,429 | A | | 3/1974 | Johnston | |
| 3,887,053 | A | | 6/1975 | Luiten | |
| 3,949,850 | A | | 4/1976 | Schumm | |
| 4,498,557 | A | | 2/1985 | Horne | |
| 4,640,403 | A | | 2/1987 | McDermott | |
| 4,712,264 | A | * | 12/1987 | Voith | 193/41 |
| 4,773,505 | A | | 9/1988 | Chiba | |
| 4,943,048 | A | | 7/1990 | Hentges | |
| 5,020,651 | A | | 6/1991 | Lockett | |
| 5,137,114 | A | * | 8/1992 | Yde et al. | 182/49 |
| 5,197,924 | A | * | 3/1993 | Gerrells | 472/116 |
| 5,702,027 | A | | 12/1997 | Barry | |
| 5,735,748 | A | | 4/1998 | Meyers et al. | |
| 6,427,822 | B1 | | 8/2002 | Johnson | |
| 6,957,716 | B1 | | 10/2005 | Norris | |

* cited by examiner

Primary Examiner — James R Bidwell
(74) Attorney, Agent, or Firm — Grace J. Fishel

(57) ABSTRACT

A laundry chute for attachment to the brackets supporting a handrail in a stairway without affecting use of the handrail or foot traffic on the stairway. The chute is formed of sections suspended from the brackets on supports that permit the angle of the chute to be adjusted such that dirty clothes slide more readily down the chute into a laundry basket below. The chute sections can be linked end-to-end and packaged for storage, transport and store display in a compact stacked or nested form. The laundry chute is easy to install, easy to remove and facilitates compliance with the house rule that there be no dirty laundry on the bathroom and bedroom floors.

10 Claims, 3 Drawing Sheets

LAUNDRY CHUTE

BACKGROUND OF THE INVENTION

1. Field of the Invention

The present invention relates to an angle adjustable laundry chute for use in a stairwell. The chute is easily attached to the handrail brackets supporting a handrail without interfering with the use or safety of the handrail.

2. Brief Description of the Prior Art

Dirty laundry on the floor is one of life's minor annoyances. One way to solve the problem of dirty clothes on the floor is to get in the habit of bringing dirty clothes daily to the laundry room. This frees up bathroom and bedroom floor space and eliminates stressful clutter. Having all the dirty clothes in one place also cuts down on how long it takes to get the laundry done.

In those homes where the laundry is in the basement, some people pick up their dirty clothes and toss them down the stairwell. This gets the dirty clothes off the floor but makes going up and down stairs hazardous. Stepping on clothes shortens the life of the clothing and it can also be embarrassing if a guest or workman uses the stairs.

There are laundry chutes which permit the passage of laundry through a partition, typically from one floor of a building to the floor below but installation is permanent, requires the services of a carpenter and is expensive.

BRIEF SUMMARY OF THE INVENTION

In view of the above, it is an object of the present invention to provide a laundry chute which may be attached to existing handrail brackets supporting a handrail without interfering with the use of the handrail. It is another object to provide a laundry chute which can be compactly packaged for display on a store shelf and which can be easily installed, detached and rehung if the user moves. It is also an object to provide a laundry chute that facilitates dirty laundry disposal and eliminates stressful clutter. Other objects and features of the invention will be in part apparent and in part pointed out hereinafter.

In accordance with the invention, a laundry chute is provided that is attachable to the brackets supporting a handrail on a stairway. The chute is formed of a plurality of sections linked end-to-end and may be open or closed topped. Supports such as straps are coupled to the chute and are couplable to the brackets. The supports permit a user to adjust the angle of the chute such that laundry placed in an open receiving end slides easily along the chute to an open discharge end where it may drop into a laundry basket. The laundry chute does not interfere with use of the handrail or foot traffic on the stairs and is of great help in reducing stressful clutter.

The invention summarized above comprises the constructions hereinafter described, the scope of the invention being indicated by the subjoined claims.

BRIEF DESCRIPTION OF THE SEVERAL VIEWS OF THE DRAWING

In the accompanying drawings, in which several of various possible embodiments of the invention are illustrated, corresponding reference characters refer to corresponding parts throughout the several views of the drawings in which.

DETAILED DESCRIPTION OF THE INVENTION

Figure 1:
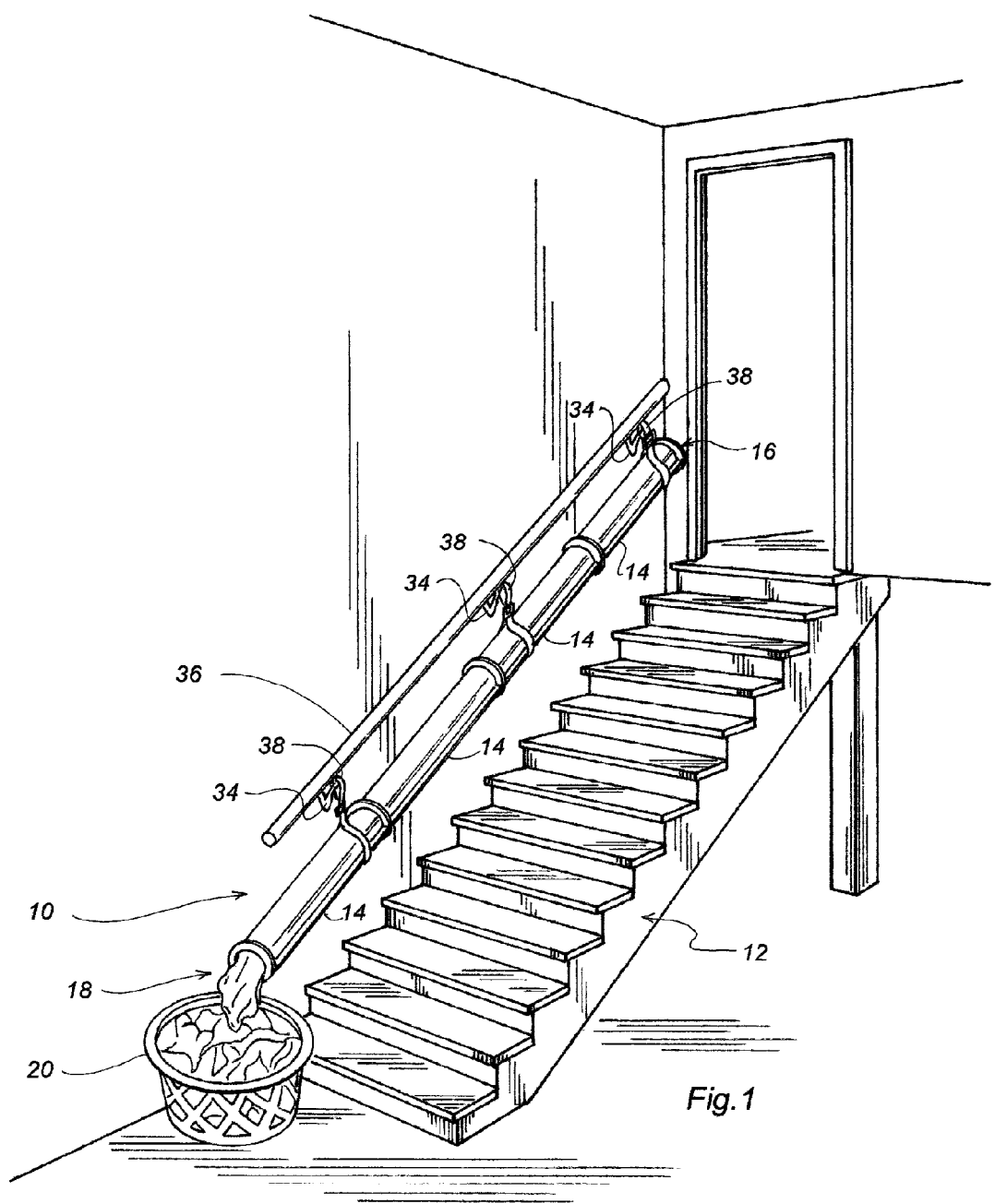
FIG. 1 is a perspective view of a laundry chute in accordance with the present invention suspended from the brackets of a handrail in a stairway.

Referring to the drawings more particularly by reference character, reference numeral 10 identifies laundry chute in accordance with the present invention. As shown in FIG. 1, laundry chute 10 is mounted at the same or a steeper incline than the incline of a stairway 12.

With continuing reference to FIG. 1, it is seen that laundry chute 10 is formed of a plurality of sections 14. Sections 14 may be identical in length or different. A number of sections 14 are assembled end-to-end such that chute 10 substantially matches the length of the incline of stairway 12. Chute 10 has an open receiving end 16 at the top and an open discharge end 18 at the bottom. Discharge end 18 may be positioned over a laundry basket 20 or the like.

Figure 4:
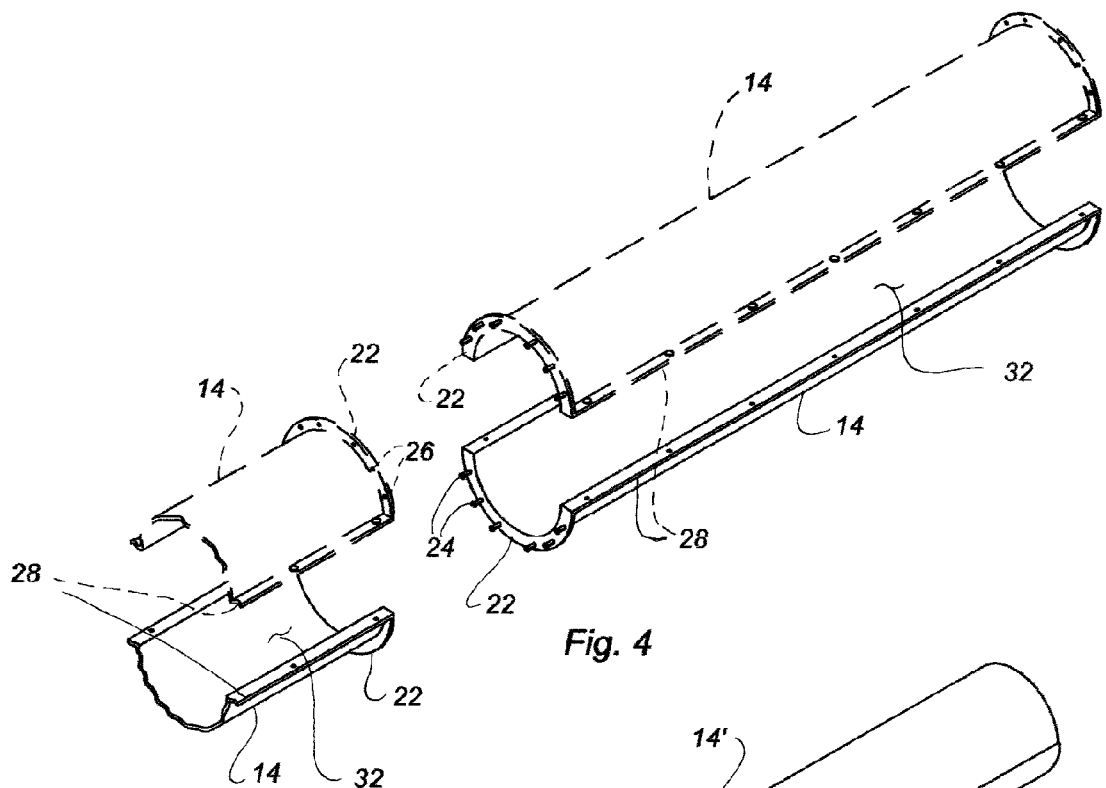
FIG. 4 is an exploded perspective view of a section of the laundry chute.
Figure 5:
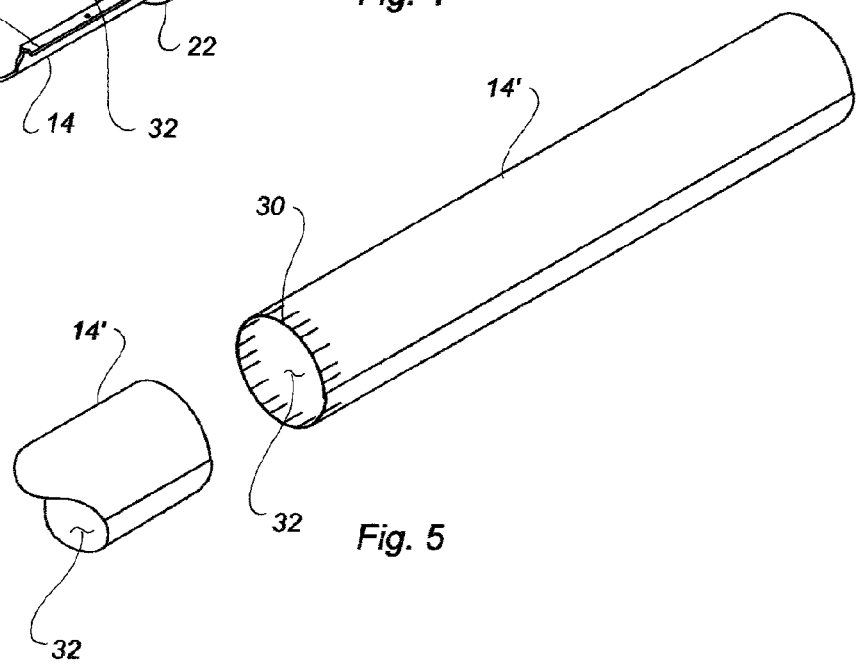
FIG. 5 is a perspective view of an alternate embodiment of a section of the laundry chute.

When laundry chute 10 is disassembled for storage or shipment, sections 14 are preferably nestable or stackable. As shown in FIG. 4, sections 14 may be semi-circular in cross-section with end flanges 22 by means of which the sections may be linked end-to-end as for example with pop fasteners 24 which are received in holes 26 provided on the other member. Alternatively, sections 14 may be provided with a belled first end into which a second end of another section may be received. Sections 14 may also be provided with side flanges 28 by means of which sections 14 may be joined to form a tube. As heretofore described, sections 14 may be nested for storage or shipment. Sections 14' as shown in FIG. 5 are formed as a sheet which is rolled into a tube. For assembly end to end, one end of each section 14' may be crimped 30 for insertion into an uncrimped end of another section 14'.

Laundry chute sections 14, 14' may be formed of plastic or metal. A rigid or semi-rigid plastic may be preferred such that laundry chute 10 is susceptible of a low cost of manufacture with regard to both materials and labor, and which accordingly is then susceptible of low prices of sale to the consuming public, thereby making laundry chute 10 economically available to the buying public. An inner surface 32 of sections 14 or 14' may be treated with a lubricous material such as Teflon such that laundry slides easily along laundry chute 10 to open discharge end 18 and laundry basket 20.

Laundry chute 10 is attachable to brackets 34 supporting a handrail 36 along stairway 12. By suspending laundry chute 10 from brackets 34, laundry chute 10 does not interfere with the use or safety of handrail 36. The attachment of laundry chute 10 to brackets 34 is accomplished with supports 38 which are coupled to chute sections 14, 14' and are couplable to brackets 34. Supports 38 permit a user to pitch laundry chute 10 at varying (i.e., steeper) angles to stairway 12 such that laundry placed in open receiving end 16 slides easily along laundry chute 10 to open discharge end 18. At least two supports 38 are required, one preferably at the uppermost stairway bracket 34 and one at the lowermost bracket 34 but, as shown in FIG. 1, additional supports 38 may be provided.

Figures 2, 3:
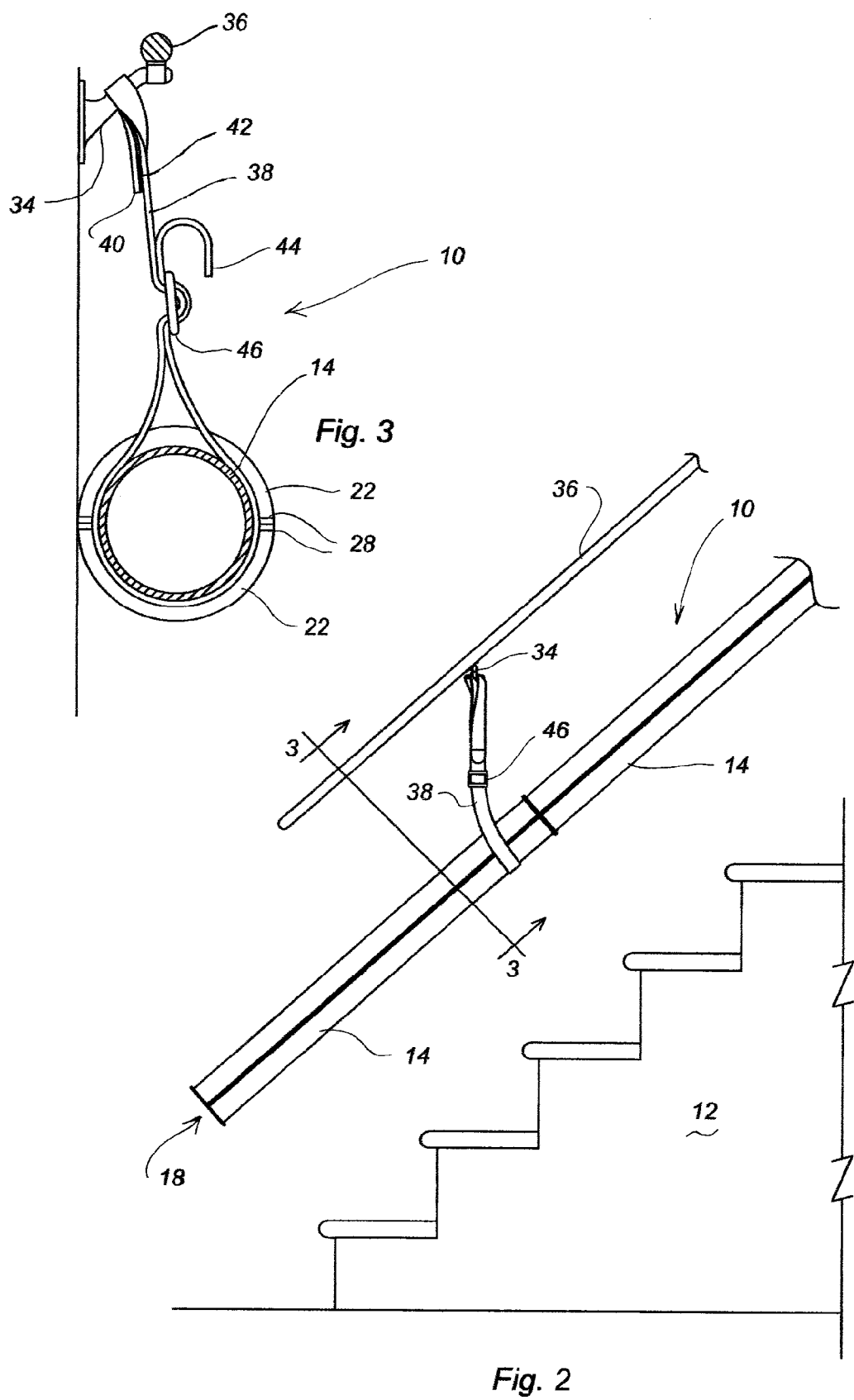
FIG. 2 is side elevation on an enlarged scale of the lower end of the laundry chute installed on the brackets.
FIG. 3 is a section taken along the plane of 3-3 in FIG. 2.

As shown in FIG. 3, support 38 is a strap, a first end 40 of which is looped around bracket 34 and secured with an attachment 42 such as male and female mating fasteners, hooks, snaps, buttons or the like. A second end 44 of strap support 38 is looped around laundry chute section 14 and provided with a length adjuster 46 such as a buckle, although attachments 42 used for first end 40 may be used instead.

In use, sections 14 and 14' may closely packed in a box together with a number of supports 38. This facilitates sale of the product as store display space is at a premium. As will be readily apparent, laundry chute 10, whether open topped or closed, may be easily assembled and hung from brackets 34 with supports 38 where it does not interfere with use of handrail 36 or foot traffic on the stairs.

A user coming to the top of stairway 12 with dirty clothes may easily deposit them in open receiving end 16 whereupon they slide along laundry chute 10 to open discharge end 18 where they drop into basket 20. Stressful clutter is eliminated. Dirty laundry is not thrown on stairway 12 where it may be stepped on and damaged or where it may trip a person trying to use the stairs. The dirty laundry is centrally collected in basket 20 where it is available to be sorted and a load or two of laundry run, thus cutting down on how long it takes to do the laundry.

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

What is claimed:

1. A laundry chute attachable to brackets supporting a handrail along a stairway comprising:
   a plurality of chute sections, the number of sections being determined by the length of the sections and the length of the incline of the stairway, the chute having an open receiving end and an open discharge end;
   a plurality of supports coupled to the chute sections and couplable to the brackets supporting the handrail, said supports permitting a user to pitch the chute at varying angles to the stairway such that laundry placed in the open receiving end slides easily along the chute to the open discharge end.

2. The laundry chute of claim 1, wherein the sections making up the chute sections are nestable or stackable when disassembled to facilitate storage and shipment.

3. The laundry chute of claim 2, wherein the chute sections are semi-cylindrical with end flanges by means of which the sections may be linked end to end.

4. The laundry chute of claim 3, wherein the chute sections further have side flanges by means of which the sections may be joined to form a tube.

5. The laundry chute of claim 2, wherein the chute sections are sheets which may be rolled into a tube, one end of which is crimped for insertion in an uncrimped end of another section.

6. A laundry chute attachable to brackets supporting a handrail along a stairway comprising:
   a plurality of nestable chute sections, the number of sections being determined by the length of the sections and the length of the incline of the stairway, the chute having an open receiving end and an open discharge end;
   a plurality of straps, a first end of each strap being coupled to the chute sections and a second end of each strap being couplable to the brackets supporting the handrail, said straps including length adjusting means for permitting a user to pitch the chute at varying angles to the stairway such that laundry placed in the open receiving end slides easily along the chute to the open discharge end.

7. The laundry chute of claim 6, wherein the sections are formed of a rigid plastic material and an inner surface of the sections is treated with a lubricous material.

8. The laundry chute of claim 7, wherein the lubricous material is Teflon™.

9. The laundry chute of claim 6, wherein the length adjusting means is a buckle.

10. A laundry chute attachable to brackets supporting a handrail along a stairway comprising:
    a plurality of nestable chute sections, the number of sections being determined by the length of the sections and the length of the incline of the stairway, the chute having an open receiving end and an open discharge end;
    each said section being semi-cylindrical with end flanges by means of which the sections may be linked end to end and having side flanges by means of which the sections may be joined to form a tube; and,
    a plurality of straps, a first end of each strap being coupled to the chute sections and a second end of each strap being couplable to the brackets supporting the handrail, said straps including length adjusting means for permitting a user to pitch the chute at varying angles to the stairway such that laundry placed in the open receiving end slides easily along the chute to the open discharge end.

* * * * *